(12) United States Patent
Heinrich et al.

(10) Patent No.: US 7,828,244 B2
(45) Date of Patent: Nov. 9, 2010

(54) SUPPLY SYSTEM FOR AN AIRCRAFT

(75) Inventors: Hans-Juergen Heinrich, Hamburg (DE); Paul Joern, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/909,381

(22) PCT Filed: Mar. 24, 2006

(86) PCT No.: PCT/EP2006/002728

§ 371 (c)(1),
(2), (4) Date: Oct. 12, 2007

(87) PCT Pub. No.: WO2006/100094

PCT Pub. Date: Sep. 28, 2006

(65) Prior Publication Data

US 2008/0191094 A1    Aug. 14, 2008

Related U.S. Application Data

(60) Provisional application No. 60/665,033, filed on Mar. 24, 2005.

(30) Foreign Application Priority Data

Mar. 24, 2005  (DE) ........................ 10 2005 013 824

(51) Int. Cl.
    *B64D 41/00*    (2006.01)

(52) U.S. Cl. .................... 244/53 R; 244/58; 244/118.5; 429/20; 429/26; 429/38

(58) Field of Classification Search .............. 244/53 R, 244/58, 118.5; 429/24, 20, 26, 34, 38
See application file for complete search history.

(56) References Cited

U.S. PATENT DOCUMENTS

| | | |
|---|---|---|
| 3,404,529 A | 10/1968 | Lagerstrom |
| 5,135,184 A | 8/1992 | Billig |
| 2002/0134321 A1 | 9/2002 | Alix et al. |
| 2004/0040312 A1 | 3/2004 | Hoffjann et al. |
| 2005/0266287 A1* | 12/2005 | Hoffjann et al. .............. 429/26 |

FOREIGN PATENT DOCUMENTS

| | | |
|---|---|---|
| DE | 3929876 A1 | 3/1990 |
| DE | 4323719 A1 | 1/1995 |
| DE | 10216361 A1 | 4/2003 |
| DE | 10249588 A1 | 5/2004 |
| GB | 870271 | 6/1961 |
| RU | 2079684 C1 | 5/1997 |
| RU | 2202732 C2 | 4/2003 |

* cited by examiner

*Primary Examiner*—J. Woodrow Eldred
(74) *Attorney, Agent, or Firm*—Christopher Paradies; Fowler White Boggs P.A.

(57) ABSTRACT

A supply system that encompasses a vapor generator, may be used to generate water. The vapor generator is supplied with hydrogen and oxygen, and generates hot water vapor, which may be used for supplying energy and water. For example, using the supply system reduces a take off weight for an aircraft and supply redundancy.

11 Claims, 1 Drawing Sheet

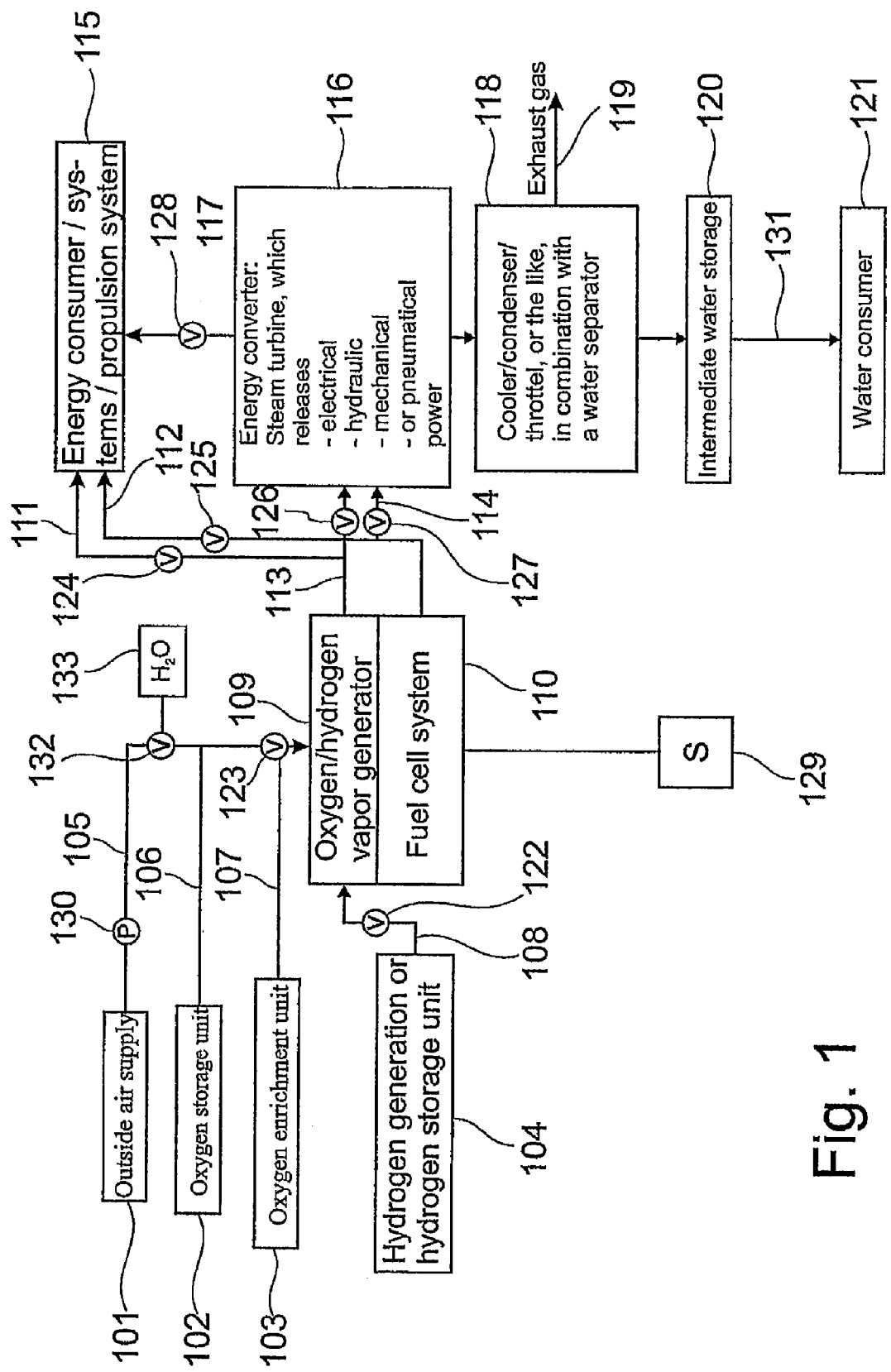

SUPPLY SYSTEM FOR AN AIRCRAFT

REFERENCE TO RELATED APPLICATIONS

This application claims the benefit of the filing date of U.S. Provisional Patent Application 60/665,033 filed on Mar. 24, 2005 and of German Patent Application 10 2005 013 824.1 filed on Mar. 24, 2005, the disclosures of which are hereby incorporated by reference.

FIELD OF THE INVENTION

The field relates to supply systems for aircraft.

BACKGROUND OF THE INVENTION

Modern aircraft, in particular large aircraft or aircraft with a high passenger capacity, must carry larger quantities of water in order to supply the different systems that require water during flight. For example, these include onboard kitchens, toilets, sinks and showers. The water quantities increase the weight of the aircraft, thereby reducing the efficiency of the aircraft. What is needed is a system that helps increase efficiency and reduce weight.

SUMMARY OF THE INVENTION

It is one object to provide a supply system for an aircraft that reduces the onboard quantity of water.

According to an embodiment of the supply system, a supply system may comprise a vapor generator, wherein the vapor generator is capable of generating water vapor from hydrogen and oxygen, and wherein the water vapor can be used to supply water or drive the aircraft. The oxygen may also be the oxygen contained in "normal" air, for example. Furthermore, the supply system comprises a mixer, for controlling a quantity of water supplied to the vapor generator for controlling a temperature or a quantity of the generated water vapor.

Such a vapor generator may be a vapor generator used for steam sterilisation processes or temperature adjustment of bio reactors, food, packaging, medical instruments, textiles or generation of pure water in the field of pharmacy, for example.

Providing the supply system with a vapor generator may ensure an efficient supply for the aircraft at high power intensity, so that such a unit can be used, for example, for applications requiring a low aggregate weight, high efficiency or rapid response. The $H_2/O_2$ vapor generator may be highly efficient, and can be started up in a few seconds. Relatively small and light aggregates can generate very high vapor outputs.

In another embodiment of the supply system, the supply system also contains a feed unit, which is used to feed hydrogen and oxygen to the vapor generator. This may ensure that the vapor generator will always be supplied with sufficient raw materials.

In another embodiment of the supply system, the supply system also contains an energy converter, wherein the energy converter is designed to convert energy stored in the water vapor generated by the vapor generator in at least one selected from the group comprised of pneumatic energy, electrical energy, hydraulic energy, mechanical energy, energy for a heat pump, thermal energy, driving energy for an aircraft engine, and propulsive energy for the aircraft.

The use of an energy converter may make it possible to utilize the hot water vapor generated in the vapor generator for generating other forms of energy. For example, the energy converter can be designed as a steam turbine, which is driven by the water vapor, and generates electrical or mechanical energy, for example. In addition, it is possible to use the water vapor energy directly for aircraft propulsion, or indirectly for propulsion, by utilizing it to drive the aircraft engine or a drive for generating propulsion for the aircraft.

In another embodiment of the supply system, the supply system also contains a controller for controlling power generation or vapor generator supply, wherein the controller is also designed for the as-needed connection of the supply system to provide driving energy for the aircraft engine or propulsive energy for the aircraft.

As a result, the supply system can be activated or connected if needed, for example, to provide additional propulsive power for the aircraft startup process, or, e.g., given a propulsion system failure, an emergency propulsion reserve for the startup process. This further enhances the safety of the aircraft, and the engines can be relieved during the startup process. This can increase safety during the startup phase. This also makes it possible to increase the service life of the power plant.

In another embodiment of the supply system, the supply system encompasses a water unit with a water separator, wherein the water separator is designed to separate water from the water vapor of the vapor generator.

The water separator may allow one to rapidly and effectively derive water from the water vapor, which ensures that sufficient water is always available for onboard operations.

In another embodiment of the supply system, the water unit has an intermediate water store for temporarily storing water.

This may eliminate the potential for water supply shortages given an increased demand for water, since sufficient fresh water is always temporarily stored in order to offset any peak demand that may arise.

In another embodiment of the supply system, the supply system encompasses a fuel cell to supply the energy converter with water vapor or generate electrical energy or propulsive energy (e.g., by way of a downstream energy conversion system).

For example, the fuel cell or fuel cell system can be arranged to the side of the vapor generator, and support the latter during water vapor production or the provision of energy to the power plants or electrical consumers on board the aircraft. This provides for redundancy in aircraft supply, which further enhances system safety, and an energy and water supply that is always sufficient and tailored to demand.

In another embodiment of the supply system, the supply system has a feed unit that has at least one hydrogen generator for generating hydrogen, or an oxygen generator for generating oxygen.

This may allow for generation of the raw materials delivered to the vapor generator (hydrogen, oxygen) directly on board the aircraft, at least in part. For example, the hydrogen generator can be a reformer, which is fed with kerosene or other aviation fuels. The oxygen generator can be an onboard oxygen generating system (OBOGS), for example.

In another embodiment of the supply system, the supply system has a feed unit capable of feeding oxygen from ambient air or an oxygen storage unit. In addition, the feed unit is designed to feed hydrogen from a hydrogen storage unit. In the case of hydrogen-driven power plants, for example, the hydrogen storage unit can be a hydrogen storage unit that also delivers the hydrogen required for power plant supply. Therefore, an additional hydrogen storage unit may not be required. The oxygen storage unit can be an oxygen storage unit (e.g., comprising part of the oxygen system of the aircraft) that can be quickly and easily replaced by maintenance personnel.

In another embodiment of the supply system, the supply system also encompasses a mixer for regulating a quantity of cooling air or water fed to the evaporator.

Providing a mixer may make it possible to set the vapor temperature or vapor quantity accordingly, for example.

In another embodiment of the supply system, a corresponding supply system is used in an aircraft for purposes of water generation.

In an embodiment of the supply system, the supply system has a vapor generator that may be used to obtain fresh water on board an aircraft, thereby significantly reducing the overall quantity of fresh water to be transported.

In another embodiment of the supply system, a corresponding supply system is used in an aircraft for generating driving energy for the aircraft.

This may allow obtaining of energy for driving the aircraft directly from hydrogen and oxygen with a high level of efficiency.

Another embodiment of the supply system describes a method for supplying an aircraft with water. The method here comprises the steps of generating water vapor from hydrogen and oxygen in the vapor generator, controlling a quantity of water supplied to the vapor generator for controlling a temperature or a quantity of the generated water vapor by a mixer, and a separation of water from the water vapor of the vapor generator into a water unit.

In another embodiment of the supply system, the method may also comprise the step of driving the aircraft with the water generated in the vapor generator. The vapor may here be expelled directly via the power plant, so as to generate propulsion as a result, or be used indirectly for driving the aircraft engine, so as to indirectly generate propulsion as a result.

In one example, an aircraft having a corresponding supply system is provided.

Embodiments of the supply system will be described below with reference to FIG. 1.

BRIEF DESCRIPTION OF THE FIGURES

FIG. 1 shows a block diagram for illustrating the system architecture according to an embodiment of the supply system.

DETAILED DESCRIPTION

The examples described and drawings rendered are illustrative and are not to be read as limiting the scope of the invention as it is defined by the appended claims. FIG. 1 shows a block diagram representing how a supply system according to an embodiment of the supply system may operate. As evident from FIG. 1, the supply system has a feed unit 101 to 108, a vapor generator 109 and an energy converter 116. The feed unit 101 to 108 here encompasses an outside air feed 101, an oxygen storage unit 102 and an oxygen enrichment unit 103, which are each connected to the vapor generator 109 by means of lines 105, 106, 107.

The oxygen enrichment unit 103 can take the form of an onboard oxygen generating system (OBOGS), for example, which generates oxygen during flight. A pump 130 can also be provided, e.g., which compresses the outside air from the outside air feed 101 before it is fed to the vapor generator 109. Of course, the pump 130 can be installed at another location of the lines 105 to 107. Several pumps 130 can also be provided to achieve redundancy or increased flexibility.

In addition, valves 123, that control the inflow of outside air, oxygen from the oxygen storage unit 102 or enriched oxygen from the oxygen enrichment or oxygen generation unit 103 may be provided. The valves 123 are here directly secured to the outlet of units 101 to 103 (not shown on FIG. 1). In addition, a three-way valve 123 can be provided, which is secured to a connection point of lines 105 to 107, and correspondingly regulates the flow or mixing ratio.

It should be noted that the oxygen supply units 101 to 103 may be provided in any combination desired. For example, one embodiment may provide that only an oxygen storage unit is provided in the form of compressed gas cylinders. Another embodiment may provide that an oxygen enrichment unit 103 be used to enhance the oxygen storage unit 102. This ensures a redundancy that enhances system safety and saves resources.

In addition, the feed unit has a hydrogen generator for generating hydrogen, or a hydrogen storage unit 104. Both systems can also be used side by side. The hydrogen storage unit can be a hydrogen compressed gas cylinder, for example, or be a hydrogen tank, which is also used for supplying aircraft engines. The water generating system can be designed as a reformer, for example, which generates hydrogen gas from kerosene. However, other hydrogen generating units may also be used.

In addition, an externally controllable valve 122 may be secured in the line 108 that feeds the hydrogen to the vapor generator 109.

The vapor generator 109 is provided with hydrogen gas and oxygen gas, and generates hot water vapor from it. The water vapor can then be fed via a line 113 and control valve 126 to an energy converter 116, which at least partially converts the energy stored in the water vapor into another form of energy. A steam turbine for example, may be provided for this purpose to release energy to electrical, hydraulic, mechanical or pneumatic systems. Further, the vapor generated by the vapor generator 109 can also be used for conditioning or humidifying the aircraft cabin or other equipment, for example.

The vapor generator 109 can also be connected by line 111 and control valve 124 to an energy consumer or a propulsion system 115, for example, to generate direct propulsion for the aircraft.

In addition, the supply system may have a fuel cell system 110, which generates electrical energy, water and heat. The water generated by the fuel cell system 110 may be released to the energy converter 116 in the form of hot water vapor through valve 127 and line 114, so as to support, enhance or replace the vapor generator accordingly.

In addition, the fuel cell system 110 may be connected via a control valve 125 and line 112 to an energy consumer or a propulsion system 115. It is here possible to supply water vapor to the propulsion system 115. Further, current from the fuel cell system 110 may be made available to the energy consumer or propulsion system 115.

In addition, a controller 129 may be provided for controlling or regulating the control valves 122 to 128 and mixer 132, or also the vapor generator 109 or the fuel cell system 110. The controller may be used to control the power generated in the vapor generator or in the fuel cell 109, 110. For example, supply of the vapor generator 109 with oxygen and hydrogen may be regulated. Further, the controller 129 may control which consumers are connected to the vapor generator 109 or fuel cell system 110. For example, the controller may be designed for connecting the supply system as required for providing driving energy for the flight engine, or propulsive energy for the aircraft.

The energy converter 116 is connected via line 117 and control unit 128, which may be a valve or switch, for example, with the energy consumers, the systems and the propulsion system 115.

In order to obtain the water from the hot vapor behind the $H_2/O_2$ vapor generator, a throttle, a cooler or the like may be used in combination with a water separator 118 instead of or in addition to the steam turbine 116 in order to obtain water from the hot vapor behind the $H_2/O_2$ vapor generator. The resultant exhaust gases may be discharged via line 119. In addition, an intermediate water storage unit 120 connected via line 131 with corresponding water consumers 121 may be provided for temporarily storing water. If the water is used as drinking water, minerals may also be supplied to the water as required.

A mixer 132 may also be provided, for example one encompassing a control valve, which can supply the vapor generator 109 with water from a water tank 133 in addition to the outside air. For example, this makes it possible to control/regulate the temperature or quantity of generated water vapor.

The valves 122 to 128 and mixer 132 are connected with the open or closed-loop control unit 129 and may be individually actuated. The valves 122 to 128, mixer 132, vapor generator 109 and fuel cell system 110 can be actuated by way of corresponding lines or wirelessly.

The hydrogen/oxygen vapor generator 109 may consist of a system in which hydrogen and oxygen (or air) can react with each other under controlled conditions to form water vapor. The vapor temperature can be set to between 200° C. and 3300° C. by subsequently adding water, for example. In addition, air can be added to cool the hot vapor.

The vapor generator 109 has a high level of efficiency, and may be started within a handful of seconds. As a result, small and light aggregates may be used to generate very high vapor outputs. The byproduct is water vapor, which can be condensed into water. A vapor temperature may be set within a broad temperature range within seconds at a thermal efficiency of 95%.

In addition, water may be injected into the hot combustion gases, and then be evaporated, permitting a specific adjustment of the state parameter of the pure water vapor. This makes it possible to set the vapor parameters within the shortest time. The advantages to this hot vapor generator include the high purity, short response times, ability to control the state parameters, and the small geometric dimensions.

Instead of pure oxygen, air or a mixture of air and oxygen may also be used. The water vapor generated in the vapor generator or fuel cell system 109, 110 may be used to drive a steam turbine, which in turn may be utilized to generate a desired form of energy. In particular, pneumatic energy systems, electrical energy systems, hydraulic energy systems, mechanical energy systems, heat-pump energy systems and thermal energy systems (e.g., heating systems) may be supplied.

In this process, water is advantageously generated in addition to energy, and may be used in the aircraft systems. As a result, less water has to be carried on board during the flight, since the water may be generated continuously or on demand during the flight. This has a positive effect on the weight of the aircraft on takeoff. If air is used for this process, only the hydrogen and the additional system weight need be taken on board, for example. In one example, up to several 100 kilograms may be saved in this way. As a result, the aircraft may be operated more efficiently, in addition to which the generated mechanical energy may simultaneously be used for one of the energy systems shown on FIG. 1 so as to increase the efficiency of the overall system. Propulsion for the aircraft can also be generated by means of this energy.

In one example, the high power intensity may make the supply system also suitable for short-term or longer-term provision of power reserves. For example, energy may be released to the aircraft power plants. It may also be possible to use the supply system briefly to generate power in support of the power plants during the startup phase, during which an aircraft requires more power than at traveling altitude. This may take place, for example, given a failure of the power plant, or during the startup process as continuous support. The power may here be provided directly in the form of propulsion power, or in a form of power than can be introduced into the power plant. A combination with other aircraft systems is also possible.

Let it additionally be noted that "comprising" does not preclude any other elements or steps, and "one" or "a" do not preclude a plurality. Further, let it be noted that features or steps that were described with reference to one of the above exemplary embodiments may also be used in combination with other features or steps in other exemplary embodiments described above. Reference numbers in the claims are not to be regarded as limiting.

Alternative combination and variations of the examples provided will become apparent based on this disclosure. It is not possible to provide specific examples for all of the many possible combinations and variations of the embodiments described, but such combinations and variations may be claims that eventually issue.

The invention claimed is:

1. An aircraft, comprising:
a water supply system for supplying water consumption demands of passengers of the aircraft;
a vapor generator coupled to the water supply system;
a mixer;
an outside air feed for feeding outside air to the vapor generator;
a source of hydrogen coupled in fluid communication with the vapor generator;
a source of oxygen coupled in fluid communication with the vapor generator;
wherein the vapor generator is capable of generating water vapor from the source of hydrogen and the source of oxygen;
the water vapor is used for supplying water to the supply system; and
the mixer is capable of controlling a quantity of water supplied to the vapor generator for controlling a temperature or a quantity of the water vapor that is generated.

2. The aircraft according to claim 1, further comprising:
a feed unit;
wherein the feed unit is capable of feeding hydrogen and oxygen to the vapor generator.

3. The aircraft according to claim 1, further comprising:
an energy converter;
wherein the energy converter at least partially converts the energy stored in the water vapor generated by the vapor generator into another form of energy.

4. The aircraft according to claim 3 wherein the energy converter includes a steam turbine.

5. The aircraft according to claim 1, further comprising:
a water unit with a water separator;
wherein the water separator is capable of separating water from the water vapor of the vapor generator.

6. The aircraft according to claim 5,
wherein the water unit includes an intermediate water storage unit coupled fluidically to the water supply system for temporarily storing water generated using the water from the vapor generator.

7. The aircraft according to claim 3, further comprising:
a fuel cell;
wherein the fuel cell is capable of supplying the energy converter with water vapor or to generate electrical energy or propulsive energy.

8. The aircraft according to claim 2,
wherein the feed unit has at least one unit selected from the group consisting of a hydrogen generator for generating hydrogen and an oxygen generator for generating oxygen.

9. The aircraft according to claim 2,
wherein the feed unit is capable of supplying oxygen from ambient air or from an oxygen storage unit; and
is capable of supplying hydrogen from a hydrogen storage unit.

10. The aircraft according to claim 1, wherein the mixer is capable of controlling a quantity of cooling air supplied to the vapor generator.

11. A method for supplying the aircraft according to claim 1 with water, comprising:
generating water vapor from hydrogen and oxygen fed to the vapor generator;
wherein the oxygen is from outside air and is fed from an outside air feed external to the aircraft and is mixed with a quantity of water supplied to the vapor generator;
controlling the quantity of water supplied to the vapor generator for controlling a temperature or a quantity of the generated water vapor;
separating water from the water vapor of the vapor generator in a water unit; and
supplying the water generated in the step of separating to the water supply system of the aircraft.

* * * * *